(12) United States Patent
Moyer et al.

(10) Patent No.: US 10,097,950 B2
(45) Date of Patent: Oct. 9, 2018

(54) METHOD OF ASSOCIATING LOCATIONS WITH DEVICES

(71) Applicant: Systems and Software Enterprises, LLC, Brea, CA (US)

(72) Inventors: Eric P. Moyer, Huntington Beach, CA (US); Andreas Rochau, Olching (DE); Christian Kissling, Germering (DE)

(*) Notice: Subject to any disclaimer, the term of this patent is extended or adjusted under 35 U.S.C. 154(b) by 0 days.

(21) Appl. No.: 15/344,352

(22) Filed: Nov. 4, 2016

(65) Prior Publication Data
US 2017/0134893 A1 May 11, 2017

Related U.S. Application Data

(60) Provisional application No. 62/252,371, filed on Nov. 6, 2015.

(51) Int. Cl.
| | |
|---|---|
| *H04W 4/02* | (2018.01) |
| *H04L 29/08* | (2006.01) |
| *H04W 8/22* | (2009.01) |
| *H04N 21/214* | (2011.01) |
| *H04N 21/414* | (2011.01) |

(52) U.S. Cl.
CPC ............ *H04W 4/02* (2013.01); *H04L 67/12* (2013.01); *H04N 21/2146* (2013.01); *H04N 21/41422* (2013.01); *H04W 8/22* (2013.01)

(58) Field of Classification Search
CPC .......... H04W 4/02; H04W 8/22; H04L 67/12; H04N 21/2146; H04N 21/41422
See application file for complete search history.

(56) References Cited

U.S. PATENT DOCUMENTS

| | | | | |
|---|---|---|---|---|
| 4,414,539 A * | 11/1983 | Armer | ............. | G01R 31/008 340/500 |
| 5,260,874 A * | 11/1993 | Berner | ............. | G09B 9/24 434/242 |
| 9,898,380 B1 * | 2/2018 | Ball | ............. | G06F 11/3027 |
| 2003/0003872 A1 * | 1/2003 | Brinkley | ............. | G06F 8/61 455/66.1 |
| 2004/0111197 A1 * | 6/2004 | Kipersztok | ............. | B64F 5/60 701/31.6 |
| 2006/0112119 A1 * | 5/2006 | Vian | ............. | G07C 5/085 |
| 2006/0143660 A1 * | 6/2006 | Logan | ............. | H04N 21/41422 725/76 |
| 2007/0027589 A1 * | 2/2007 | Brinkley | ............. | G08G 5/0013 701/3 |

(Continued)

*Primary Examiner* — Mehmood B. Khan
(74) *Attorney, Agent, or Firm* — Umberg Zipser LLP; Ryan S. Dean

(57) ABSTRACT

Methods of determining locations, types, and quantities of devices within a vehicle, in particular for in flight entertainment systems. Methods of the inventive subject matter include general sequencing, indirect sequencing, and direct sequencing. In indirect sequencing, each device connected to the in flight entertainment system's wireless network is actuated in a predetermined sequence such that the in flight entertainment system can record locations of the different devices connected to it and then correlate the device locations to a set of potential device locations. In direct sequencing, information from each device is manually collected in sequence and then correlated to potential device locations.

7 Claims, 5 Drawing Sheets

(56) References Cited

U.S. PATENT DOCUMENTS

| | | | | |
|---|---|---|---|---|
| 2011/0126242 A1* | 5/2011 | Cline | ................. | B64D 11/0015 |
| | | | | 725/76 |
| 2014/0208370 A1* | 7/2014 | Hatakeyama | ...... | H04N 21/2146 |
| | | | | 725/76 |
| 2014/0282727 A1* | 9/2014 | Keen | ................. | H04N 21/4222 |
| | | | | 725/37 |
| 2016/0090192 A1* | 3/2016 | Dunn | ................. | B64D 11/0015 |
| | | | | 340/945 |

* cited by examiner

METHOD OF ASSOCIATING LOCATIONS WITH DEVICES

This application claims priority to U.S. provisional application having Ser. No. 62/252,371, filed Nov. 6, 2015. This and all other extrinsic materials identified herein are incorporated by reference in their entirety to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is determination of wireless device locations.

BACKGROUND OF THE INVENTION

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In-flight entertainment (IFE) systems often have units that are specific to each seat on an aircraft. For example, some systems include seat-back displays, others include overhead displays, with still others include some combination of the two. Display units, whether overhead or seat-back, are typically installed at fixed locations on commercial aircraft. As technology advances, the need for wired communication between different display units becomes unnecessary, but in fully wireless IFE systems there is a need for a method of registering device locations for each display unit in the system.

In wired installations the physical locations of installed devices can be determined at run-time by analyzing the topology of the network connection between them. In wireless installations this is not possible; all wireless devices appear on the network as peers, so their physical location cannot be inferred from the network topology. The physical location of all wireless line replaceable units (LRU) must be known for accurate system status and fault reporting and to support targeted delivery of services based on aircraft cabin-class or location.

Thus, there is still a need for improved methods of associating locations with devices.

SUMMARY OF THE INVENTION

In one aspect of the inventive subject matter, a method of determining locations of a set of devices that are associated with an in flight entertainment system, including the steps of: (1) storing an electronic representation of a set of potential device locations in a server; and (2) automatically associating each device with a unique location of the set of potential device locations via a processor by actuating the devices in sequence that is based on the electronic representation, where each device is wirelessly connected to the system.

In some embodiments, the method additionally includes the step of determining device types. This can be accomplished by polling a wireless network to identify the set of devices connected to the wireless network.

The method can also include the step of interpreting a device identifier of a device using a portable electronic device, with the step of associating additionally including the task of associating each device with a unique location based on the interpreted device identifier. Polling the devices connected to the wireless network can also include the step of determining device types of each device connected to the wireless network.

In another aspect of the inventive subject matter, another method of determining locations of a set of devices that are associated with an in flight entertainment system is contemplated. The method includes the steps of: (1) storing an electronic representation of a set of potential device locations; (2) sequentially actuating each device of the set of devices in a predetermined sequencing order based on the electronic representation; and (3) associating each sequentially actuated device, based on the sequence that each device is actuated, with a unique location from the set of potential device locations.

In some embodiments, the method additionally includes the step of polling a wireless network for the in flight entertainment system to identify connected devices. The step of polling can additionally include the step of determining the device types of each device connected to the network.

In another aspect of the inventive subject matter, methods of determining locations of a set of devices that are associated with an in flight entertainment system are provided. Contemplated methods include the steps of: (1) storing a map having a set of potential device locations; (2) manually recording a device identifier associated with a device of the set of devices; and (3) associating the device, based on the manually recorded device identifier, with a unique location the set of potential device locations.

In some embodiments, the step of manually recording further includes using an electronic device to record the device identifier. Additionally or alternatively, the step of associating also includes using the electronic device to electronically associate the interpreted device identifier with the unique location. In some embodiments, the device identifier is a visual identifier (e.g., a barcode or a QR code) presented by an electronic display coupled with the device.

In some embodiments, the step of manually recording includes using an electronic device to interpret the device identifier via near field communication (NFC) protocol.

DETAILED DESCRIPTION

Figure 1:
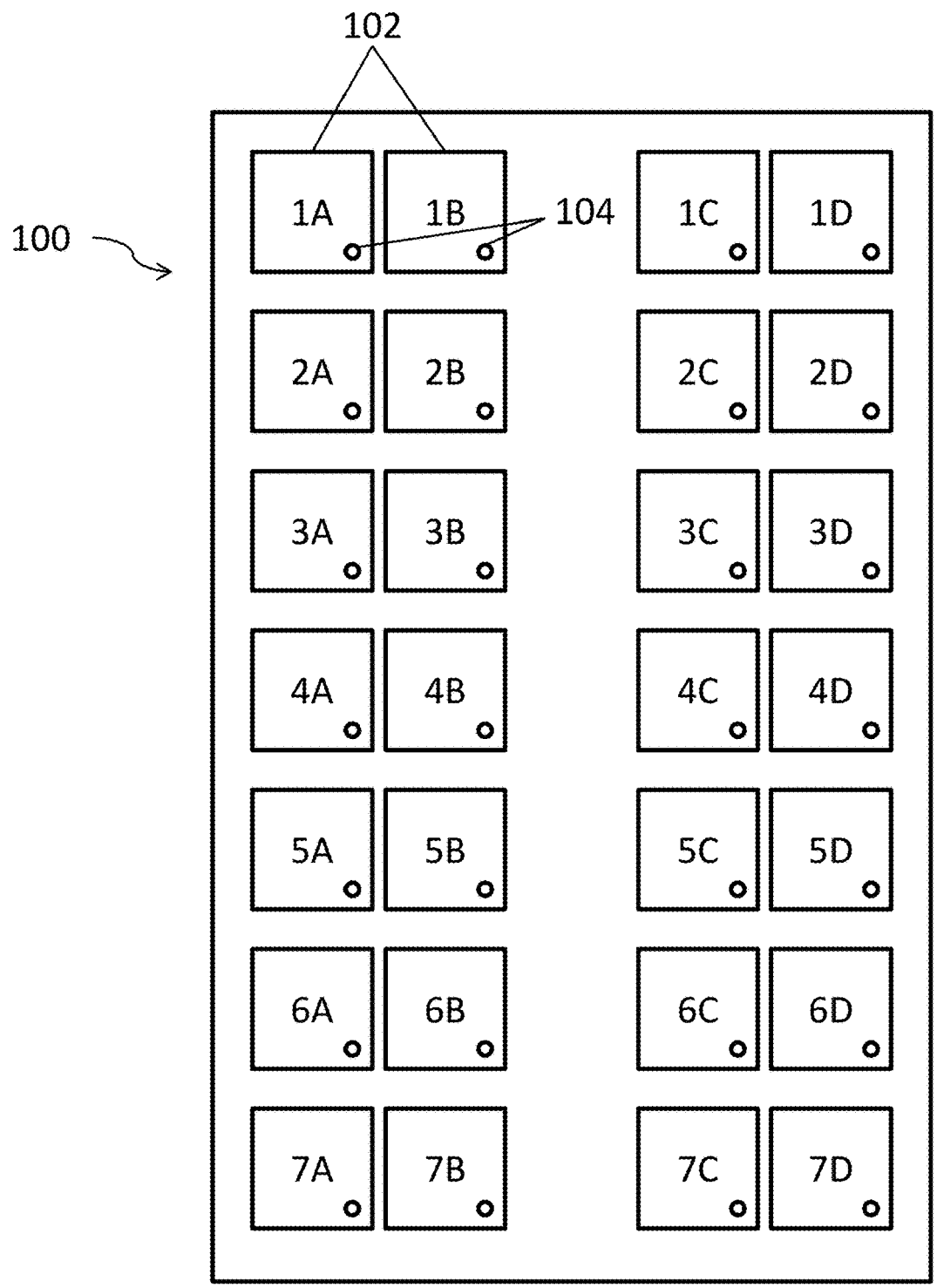
FIG. 1 shows a map of LRU locations.

In one aspect of the inventive subject matter, a method of determining wireless device locations that includes the performance of a manual maintenance operation in a manner that minimizes the time required to capture device locations, minimizes the possibility of operator error, supports configuration changes after initial installation (unit repair swaps, etc.), and provides verification that Line-Replaceable Units (LRUs) are properly associated with their physical location is contemplated. The term LRU can refer to seatback display units, overhead display units, or any other unit implemented in an IFE (in-flight entertainment) system.

As used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The inventors contemplate two different types of sequencing: direct sequencing and indirect sequencing.

Various LRU types can be used in accordance with the inventive subject matter. In some embodiments, all of the LRUs are of the same type, but the inventors also contemplate that IFE systems can incorporate multiple different types of LRUs. Although the methods of the inventive subject matter can include a step of determining what LRU types are being used with the IFE system, the step is not required.

LRU types can be determined automatically or manually. For example, when LRUs are all connected to the IFE system wirelessly, the IFE system can wirelessly determine what LRUs are connected. Alternatively, a person can manually enter into the IFE system what LRUs are connected to the IFE system. LRUs can be identified by, for example, a MAC address, an IP address, a serial number, or any other unique or assigned identifier. Generally, direct sequencing will performed on a single LRU type at a time, though direct sequencing more than one type is possible as well.

Before direct sequencing begins, the nominal locations of all LRUs are known to the IFE system controller. Typically this information is stored in the IFE system controller's Aircraft Configuration Database (ACD). For example, for a given aircraft the System Controller would know how many LRUs (or, for example, an overhead display unit) are present in that aircraft's configuration and at which seat/row location those LRUs are installed. In other words, a map of an aircraft identifying locations for LRUs can be used to keep track of LRU locations. The map can be different depending on the type of aircraft and the IFE setup to be implemented.

FIG. 1 shows a visual representation of a possible map 100 where LRUs are to be placed on seat backs, which are represented as seat locations 102. The map 100 can be displayed on, for example, a control panel or a portable electronic device.

The actual direct sequencing of the LRUs can be initiated as a maintenance operation. In some embodiments, it can be initiated from a crew panel, but in others it can be initiated at any connected LRU or other device connected to the IFE system's network.

Figures 2A, 2B:
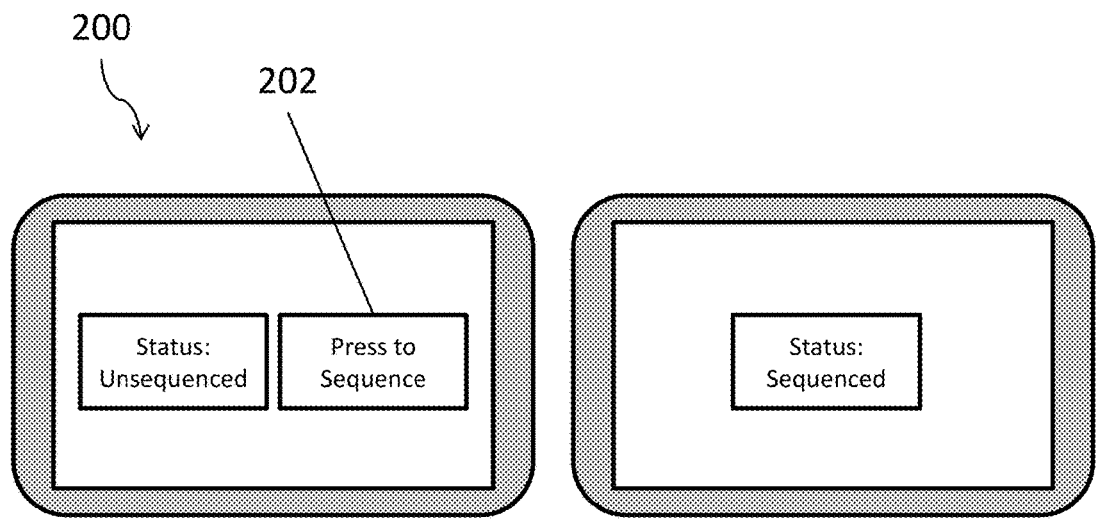
FIG. 2A shows a display device that can be used to perform sequencing, prior to conducting sequencing.
FIG. 2B shows a display device that can be used to perform sequencing, after conducting sequencing.

Once initiated, direct sequencing is carried out by the completion of a number of steps. To complete the necessary steps, each LRU has a direct sequencing interface. Each LRU connected to the IFE system (i.e., in the "sequencing pool") preferably implements an input control which can recognize and report a "Sequencing Press Event" to the network. The input control is typically a button but could be implemented using a touch screen, a capacitive or resistive touch area, a virtual near-field data detector, an IR sensor, or the like. FIG. 2A shows a touch screen 200 having an input 202 that registers a Sequencing Press Event.

Each LRU in the sequencing pool preferably also implements an output device which is detectable by the operator. The output device is typically a light but could be implemented as a video display, LCD, LED, near field data emitter, IR emitter, or similar. At a minimum the output device should be capable of indicating two states: sequenced and unsequenced. Additional information could be displayed to optimize direct sequencing time and error immunity.

In addition to an output device, a map of LRU locations can also include indicators that show when an LRU has been associated with a particular location. FIG. 1 shows a visual representation of a possible map 100 where LRUs are to be placed on seat backs. Each seat location 102 on the map can also include an indicator 104, which shows when an LRU has been associated with a location 102 on the map 100.

At the start of direct sequencing, all of the LRUs are initialized to an unsequenced state. Then, during direct sequencing, all LRU's display a current state (e.g., unsequenced/sequenced) on their output device, which is depicted as a touch screen 200 in FIG. 2A. To perform direct sequencing, an operator (e.g., a flight attendant) activates the input control on each LRU in the sequencing pool in a predetermined order (for example, left forward to aft, followed by right aft to forward). For example, FIG. 2A depicts a touch screen 200 interface where an operator can press the "Press to Sequence" button 202 (the input control) to perform the direct sequencing operation. By activating the input control 202 on each LRU in the predetermined order, the IFE system registers each LRU via the IFE system's wireless network such that the location of each LRU is known to the IFE system by mapping each input signal to a location on the location map (e.g., the LRU map shown in FIG. 1).

When an LRU's input control is activated, the IFE system controller associates the next available physical location identifier with that LRU in accordance with the predetermined sequencing order (which is determined by the nominal location map), and changes the state of that LRU from "unsequenced" to "sequenced." This change of state can be displayed on each LRU as in FIG. 2B, which shows how FIG. 2A would change after an operator pressed on the "Press to Sequence" button.

Once direct sequencing is completed, direct sequencing verification can be performed. Direct sequencing verification can be conducted by checking each LRU's output device to see a physical location identifier. In other words, if the direct sequencing operation is committed, then the mapping of LRUs to physical location identifiers determined by the direct sequencing operation is adopted by the IFE system. If the results are rejected, then direct sequencing must still be performed again before the IFE system can take LRU location into account.

Some LRUs do not have output devices capable of displaying a physical location identifier, and in those embodiments, all that can be seen is an indication of "sequenced" or "unsequenced" to verify whether the process was completed correctly. Displaying a physical location identifier aids in verifying that direct sequencing has been performed properly.

Indirect sequencing is a less automated form of sequencing. As mentioned above, indirect sequencing uses the manual observation, transcription, and reporting of arbitrary unique identifiers to determine the association between each LRU and its physical location. This differs from direct sequencing which is conducted by, for example, sequential button pressing on LRUs which are then automatically registered as existing in a predetermined location.

As with direct sequencing, various LRU types can be used. In some embodiments, all of the LRUs are of the same type, but the inventors also contemplate that IFE systems can incorporate multiple different types of LRUs. Although the methods of the inventive subject matter can include a step of determining what LRU types are being used with the IFE system, the step is not required.

LRU types can be determined automatically or manually. For example, when LRUs are all connected to the IFE system wirelessly, the IFE system can wirelessly determine what LRUs are connected. Alternatively, a person can manually enter into the IFE system what LRUs are connected to the IFE system. LRUs can be identified by, for example, a MAC address, an IP address, a serial number, or any other unique or assigned identifier. Generally, indirect sequencing will performed on a single LRU type at a time, though sequencing more than one type is possible as well.

Before indirect sequencing begins, the nominal locations of all LRUs should be known to the IFE system controller. Typically this information is stored in the IFE system controller's Aircraft Configuration Database (ACD). For example, for a given aircraft the System Controller would know how many LRUs (or, for example, an overhead display unit) are present in that aircraft's configuration and at which seat/row location those LRUs are installed. In other words, a map of an aircraft identifying locations for LRUs can be used to keep track of LRU locations. The map can be different depending on the type of aircraft and the IFE setup to be implemented.

The actual indirect sequencing of the LRUs can be initiated as a maintenance operation. In some embodiments, it can be initiated from a crew panel, but in others it can be initiated at any connected LRU or other device connected to the IFE system's network.

Each LRU in the sequencing pool preferably also implements an output device which is detectable by the operator. The output device is typically a light but could be implemented as a video display, LCD, LED, near field data emitter, IR emitter, or similar. At a minimum the output device should be capable of indicating two states: sequenced and unsequenced, and indicating a unique "sequencing identifier." Additional information could be displayed to optimize indirect sequencing time and error immunity.

At the start of indirect sequencing, all LRUs are issued a unique "sequencing identifier." During indirect sequencing, all LRUs display their sequence identifier (e.g., visually or electronically via Bluetooth, NFC, WiFi, or some other electronic or wireless communication protocol). Then, to perform indirect sequencing, the operator records the sequencing identifier of each LRU in association with the physical location identifier of that LRU (e.g., the nearest seat location). In some embodiments, the sequencing identifier is a visual identifier presented, for example, on an electronic display or as feature of the physical structure of the LRU (e.g., a sticker or a printed-on feature bearing a sequencing identifier). Examples of visual sequencing identifiers include one dimensional visual elements (e.g., line-style barcodes) or two dimensional visual elements (e.g., quick response (QR) codes). Alternatively or additionally, the sequencing identifier can be presented by the output device non-visually via, for example, near filed communication protocol (NFC), WiFi, Bluetooth, RFID, or any other wireless protocol known in the art.

The record can be made manually and then entered into the system (e.g., entered at the crew panel). In other embodiments, the record can be made in real-time on a wireless device or the like. For example, a crew member can have a portable electronic device that they can use to record the sequencing identifier into (or in some embodiments, the device can scan the sequencing identifier). When each sequencing identifier is recorded into that device, the location of the LRU associated with that sequencing identifier is then registered within the IFE system. This, in essence, assigns each LRU to each of the nominal locations already known to the IFE system.

Once indirect sequencing is completed, indirect sequencing verification can be performed. Indirect sequencing verification can be conducted by checking each LRU's output device to see a physical location identifier. In other words, if the indirect sequencing operation is committed, then the mapping of LRUs to physical location identifiers determined by the indirect sequencing operation is adopted by the IFE system. If the results are rejected, then indirect sequencing must still be performed again before the IFE system can take LRU location into account.

Figure 3:
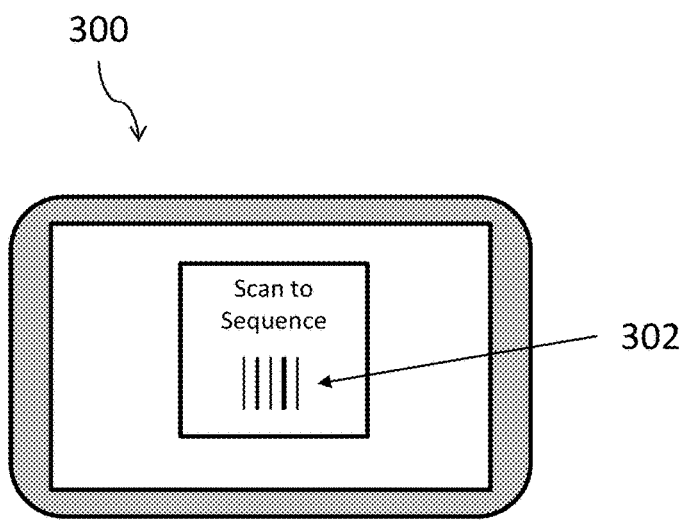
FIG. 3 shows an LRU displaying a barcode to facilitate sequencing.

An example of an LRU that can be indirectly sequenced is shown in FIG. 3. The LRU 300 presents on its display a barcode 302. A person tasked with carrying out the indirect sequencing task would scan the barcode 302 corresponding to this LRU 300 in a predetermined order such that the location of the LRU 300 is determined according to the indirect sequencing procedure described above.

Some LRUs do not have output devices capable of displaying a physical location identifier, and in those embodiments, all that can be seen is an indication of "sequenced" or "unsequenced" to verify whether the process was completed correctly. Displaying a physical location identifier aids in verifying that indirect sequencing has been performed properly.

Figure 4:
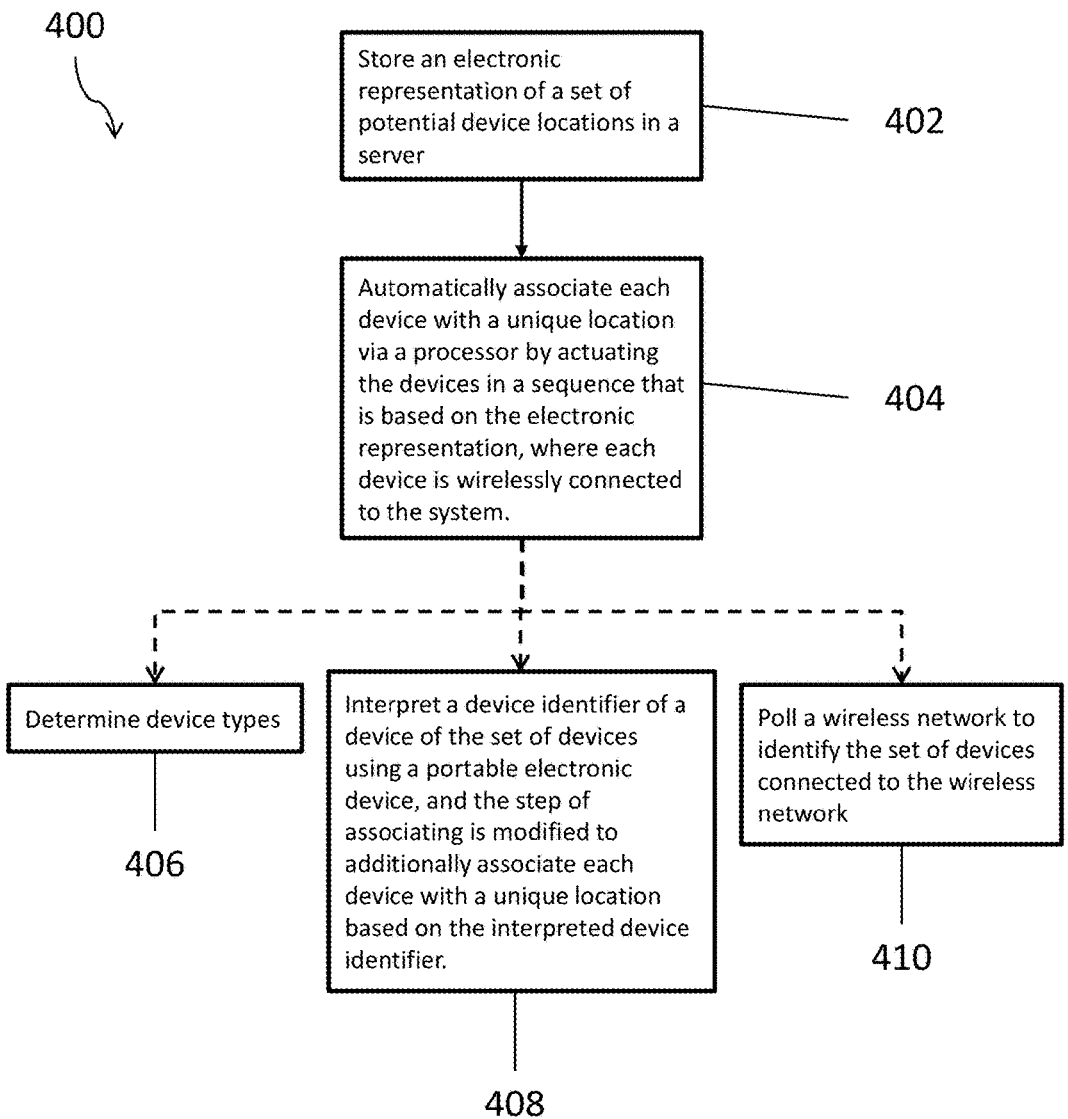
FIG. 4 shows a flow chart of a general sequencing method.

An example of a general sequencing method 400 is shown in FIG. 4. In the first step 402, an electronic representation of a set of potential device locations is stored in a server. In the second step 404, each device is automatically associated with a unique location via a processor by actuating the devices in a sequence that is based on the electronic representation, where each device is wirelessly connected to the system.

Outside of these method steps, three optional steps 406, 408, & 410 are contemplated. In optional step 406, device types are determined. In optional step 408, a device identifier of a device is interpreted using a portable electronic device, and the step of associating is modified to additionally associate each device with a unique location based on the interpreted device identifier. In optional step 410, a wireless network is polled to identify the set of devices connected to the wireless network.

Figure 5:
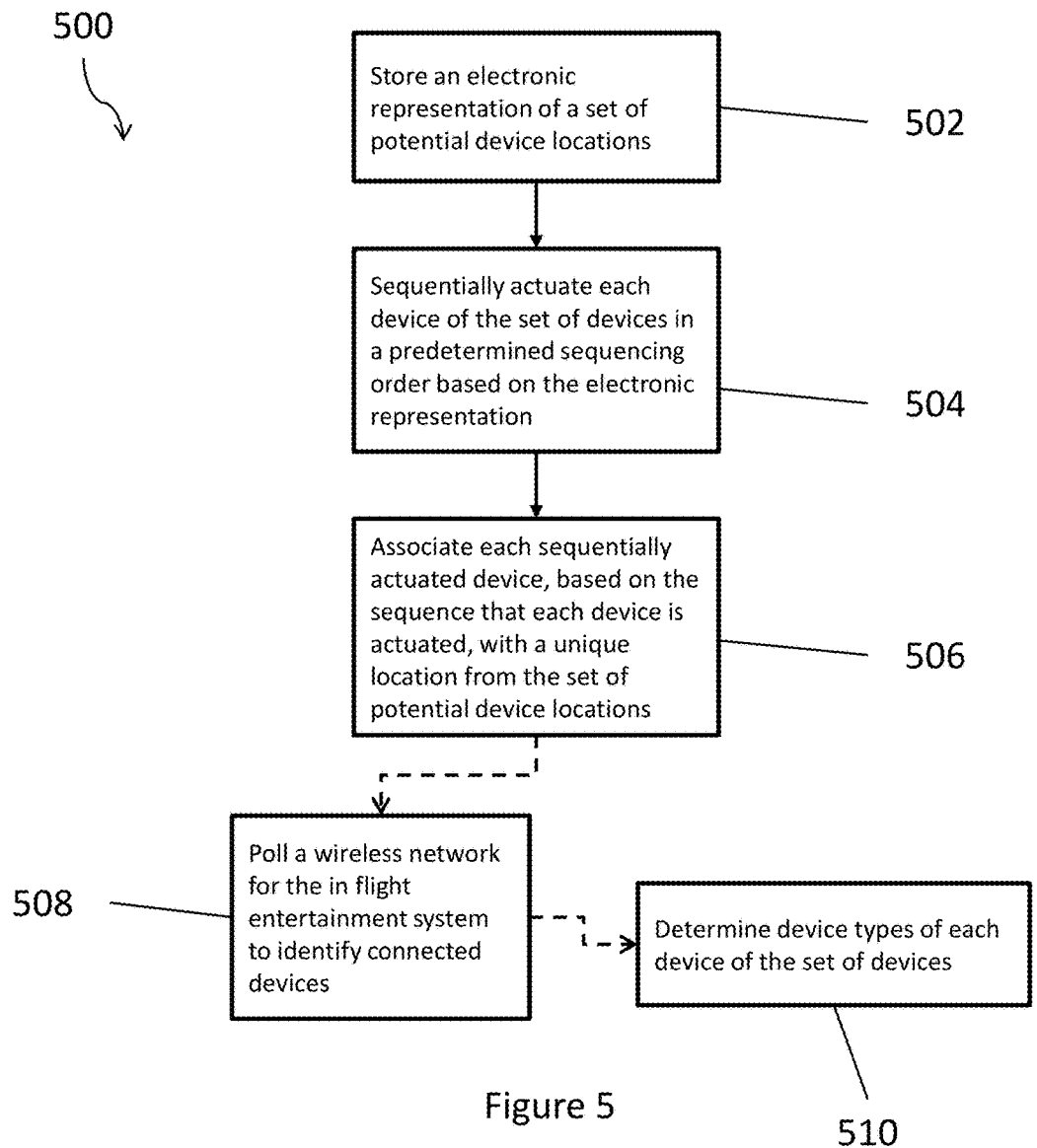
FIG. 5 shows a flow chart of an indirect sequencing method.

An example of an indirect sequencing method 500 is shown in FIG. 5. In the first step 502, an electronic representation of a set of potential device locations is stored (e.g., to a server). In the next step 504, each device of the set of devices is sequentially actuated in a predetermined sequencing order based on the electronic representation. In the next step 506, each sequentially actuated device, based on the sequence that each device is actuated, is associated with a unique location from the set of potential device locations.

Two optional steps 508 and 510 can also be executed as a part of the method. In step 508, a wireless network is polled for the in flight entertainment system to identify connected devices. In step 510, device types of each device are determined.

Figure 6:
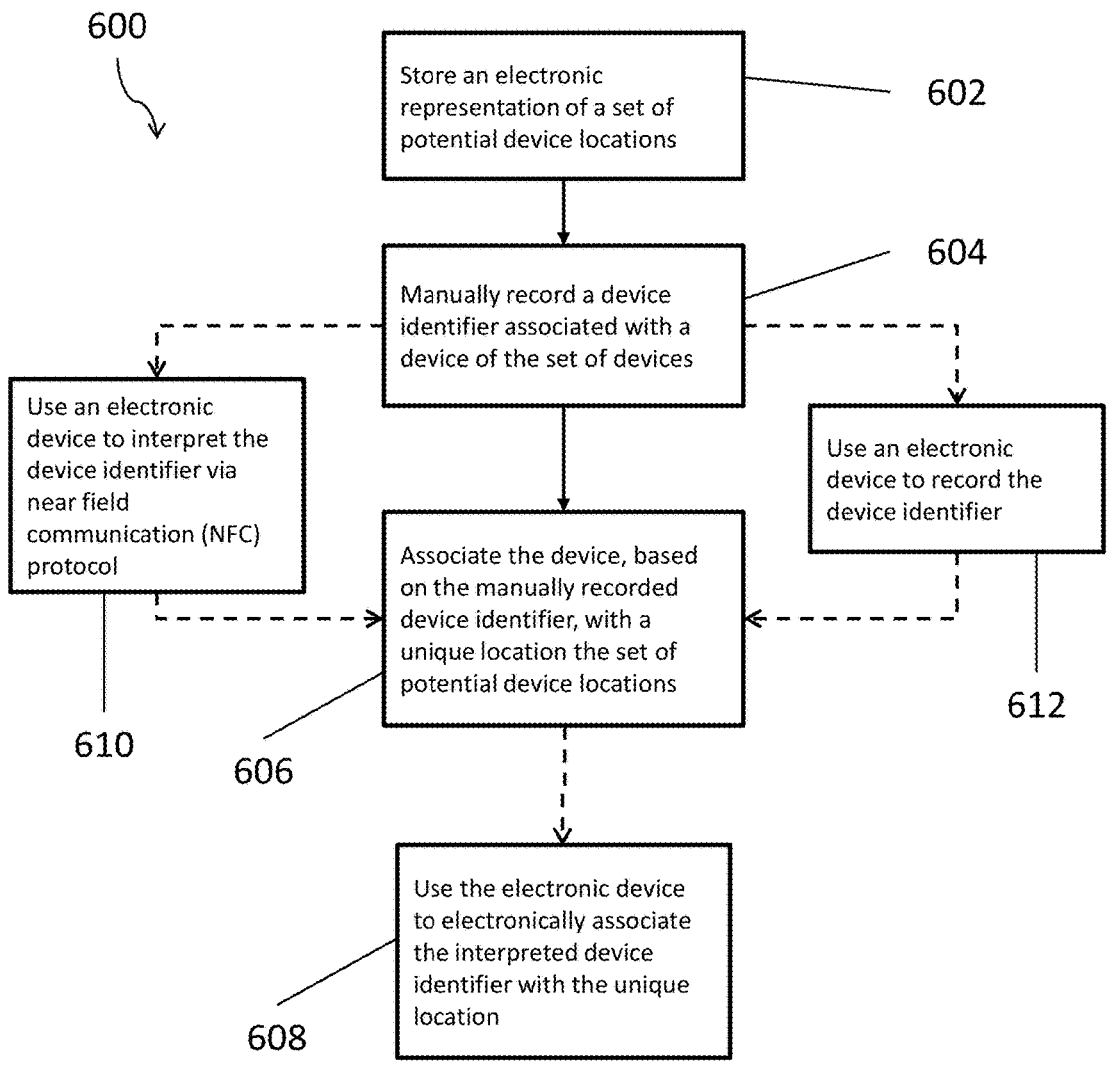
FIG. 6 shows a flow chart of a direct sequencing method.

An example of a direct sequencing method 600 is shown in FIG. 6. In the first step 602, an electronic representation of a set of potential device locations is stored (e.g., to a server). In the next step 604, each device identifier associated with a device is manually recorded. In the next step 606, the device, based on the manually recorded device identifier, is associated with a unique location the set of potential device locations. In the next step 608, the electronic device is used to electronically associate the interpreted device identifier with the unique location.

Two optional steps 610 and 612 can also be executed as a part of the method. In step 610, an electronic device (e.g., a mobile computing device like a cell phone) is used to interpret the device identifier via near field communication (NFC) protocol. In step 612, an electronic device is used to record the device identifier.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of determining locations of a set of line-replaceable units (LRUs) that are associated with an in-flight entertainment system, wherein each of the units has a display, the method comprising the steps of:
   storing in a server an electronic representation of potential locations for each of the set of LRUs;
   initializing each of the LRUs to an unsequenced state;
   manually actuating the LRUs in a sequence based on the electronic representation; and
   automatically associating each LRU of the set of LRUs with a unique location of potential locations via a processor by actuating the LRUs one at a time and in a sequence that is based on the electronic representation, wherein each LRU is wirelessly connected to the system; and
   storing in the server the associated location of each LRU based on (i) the sequence in which each LRU is actuated relative to the others of the set of LRUs and (ii) the stored electronic representation.

2. The method of claim 1, further comprising the step of determining device types.

3. The method of claim 1, further comprising the step of interpreting a device identifier of a LRU of the set of LRU using a portable electronic device, and wherein the step of associating further comprises associating each LRU with a unique location based on the interpreted device identifier.

4. The method of claim 1, further comprising polling a wireless network for the in-flight entertainment system to identify LRUs of the set of LRUs that are connected to the wireless network.

5. The method of claim 4, wherein the step of polling further comprises determining device types of each LRU of the set of LRUs.

6. The method of claim 1, further comprising each LRU presenting its associated location on the display of that LRU after actuation of that LRU.

7. The method of claim 1, further comprising modifying a state of each LRU from sequenced to sequenced after the LRU is associated with the unique location.

* * * * *